United States Patent [19]

Miller

[11] Patent Number: 4,544,830
[45] Date of Patent: Oct. 1, 1985

[54] THERMOSTATICALLY CONTROLLED ELECTRIC KETTLE

[75] Inventor: Walter E. Miller, Barrie, Canada

[73] Assignee: Black & Decker Inc., Newark, Del.

[21] Appl. No.: 637,595

[22] Filed: Aug. 3, 1984

[30] Foreign Application Priority Data

Aug. 12, 1983 [CA] Canada ................................... 434519

[51] Int. Cl.⁴ ......................... H05B 1/02; A47J 27/21
[52] U.S. Cl. ...................................... 219/328; 99/281; 219/330; 219/437; 219/441
[58] Field of Search ................ 219/328, 330, 436–438, 219/441, 442; 99/281

[56] References Cited

U.S. PATENT DOCUMENTS 3,784,788  1/1974  Fourney ............................. 219/441

FOREIGN PATENT DOCUMENTS

| 458242 | 1/1975 | Australia . | |
|---|---|---|---|
| 976218 | 10/1975 | Canada ................. | 219/437 |
| 926671 | 5/1963 | United Kingdom ................ | 219/441 |
| 1,018,818 | 2/1966 | United Kingdom ................ | 219/437 |
| 1293956 | 10/1972 | United Kingdom ................ | 219/437 |
| 1426427 | 2/1976 | United Kingdom ................ | 219/437 |
| 1487384 | 9/1977 | United Kingdom . | |
| 2102205 | 1/1983 | United Kingdom ................ | 219/437 |

*Primary Examiner*—A. Bartis
*Attorney, Agent, or Firm*—Raymond A. Eckersley

[57] ABSTRACT

An electric kettle having an unrestricted spout opening is provided with an electric heating element controlled by a thermostatic simmer control or boil cutout, the thermostatic element of which is located exteriorly of the kettle body above the top thereof and adjacent to the spout opening. A steam diverter scoop extends into the spout opening to intercept the uppermost portion of the live steam flowing toward the spout opening and diverts it into heating relation with the thermostatic element to provide rapid heating thereof upon commencement of active boiling in the kettle. The thermostatic element is housed within the forepart of the kettle handle, which also serves to conceal the wires connecting the thermostatic element to the heating element and other electrical components located in the bottom of the kettle. The diverter includes a shield portion in radiation shielding relation to the thermostatic element to limit radiation of heat to the element from the kettle body. The provision of a thermostatic element which is normally shielded from the rise in temperature in the kettle interior while being exposed a portion of the stream of steam generated upon free boiling within the kettle permits use of a coarsely calibrated, not unduly sensitive, thermostatic element ensuring switching off or other control function of the kettle regardless of altitude.

9 Claims, 3 Drawing Figures

THERMOSTATICALLY CONTROLLED ELECTRIC KETTLE

BACKGROUND OF THE INVENTION

This invention is directed to an electric kettle, and in particular to an electric kettle having a boil-and-off or a boil-and-simmer capability.

The use of electric kettles having a thermosensitive switching provision is well known. Many types of arrangements have been provided having provision to conduct steam generated on the advent of rapid boiling into energizing relation with a thermostatic control, or the temperature sensing element of an electronic control system. Certain of the better known types of thermosensitive kettle arrangements are shown in U.S. Pat. No. 3,784,788 issued Jan. 8, 1974 to Fourney; Australian Pat. No. 458,242, issued Jan. 17, 1975 to Taylor and U.K. Pat. No. 1,487,384, issued Sept. 28, 1977 to Dunn. These and other like prior art arrangements are all characterized by kettles of the type wherein the spout exit from the kettle, by means of which hot water is poured from the kettle, comprises a restricted outlet, so that upon the occurrence of free boiling there is a pressure build-up within the kettle. The occurrence of this pressure build-up is utilized to force the passage of steam from the interior of the kettle to a remotely located thermosensitive device such as a thermostat.

SUMMARY OF THE INVENTION

The present disclosed arrangement provides a thermosensitive kettle control arrangement wherein the kettle has a substantially unrestricted top spout aperture constituting the sole access to the interior of the kettle for the purposes of transferring liquid into and from the kettle, including the emission of water vapour and steam at the time of boiling. This type of kettle does not lend itself to the prior art type of thermosensitive element wherein the kettle serves as a pressure generator in order to apply a localized jet of steam in heating relation against the thermostat or other thermosensitive element.

In accordance with the invention there is provided, an electric kettle having electrical heating means for heating liquid within the body of the kettle, the kettle body having an open aperture located in an upper portion of the body above the liquid level, for the substantially unrestricted passage of steam therethrough. A thermally activated control means is connected to said heating means in controlling relation therewith, including a temperature sensitive portion thereof located in an upper portion of the kettle.

Shield means interposed between the control means and the interior of the body limit the transfer of heat to the temperature sensitive portion during operation of the kettle, and fluid diverter means located within the kettle adjacent the aperture intercept a portion of steam flowing towards the aperture and divert that portion towards the temperature sensitive portion of the control means, to provide rapid heating thereof on the commencement of active boiling of liquid within the kettle.

The arrangement further includes the provision of deflector means located adjacent the temperature sensitive portion of the control means, to deflect the steam against the temperature sensitive portion. In the preferred embodiment the steam deflector means includes a shield portion located beneath the control means in radiation shielding relation therewith, to limit the radiation of heat to the control means from the body of the kettle, the adjacent top surface of the kettle also serving as part of the shield means.

A further aspect of the arrangement is the provision of a housing within the handle of the kettle wherein the temperature sensitive element is located, the handle forming an enclosure above the top surface of the kettle.

The flow of steam towards the substantially unrestricted spout is partially intercepted by a scoop which extends downwardly into the steam path, to deflect the steam rearwardly, outside the body of the kettle, within the handle recess, so as to impinge upon the temperature sensitive element. One or more relief apertures, generally provided as a pair of handle edge relief notches some 60 mils in height and located rearwardly of the temperature sensitive element, permit the outflow of air that normally fills the handle enclosure. This exhaust relief provision permits the free unchoked ingress of a deflected flow of a portion of the steam exiting the kettle, to rapidly heat the temperature sensitive element, and effect the desired control over the kettle heating element shortly after the occurrence of boiling.

The provision of a temperature sensitive element normally shielded from the rise in temperature in the kettle interior, and exposed to receive in heating relation the heat content of a significant portion of the stream of steam generated upon the occurrence of free boiling within the kettle assures rapid temperature rise in the temperature sensitive element upon the occurrence of boiling. This permits the use of a not-unduly sensitive thermostat, which can have a switching temperature value substantially below sea level boiling point. In a country whose topography provides wide variations in altitude, with consequent reductions in the boiling point of water at the higher altitudes, this characteristic of the temperatures sensitive element ensures that switching off or other control function of the kettle occurs regardless of location and altitude.

A further characteristic of the invention is the provision of a steam diverter scoop located adjacent the aperture, having a portion of the scoop extending within the kettle body to divert steam away from the aperture.

In the preferred embodiment the scoop forms an integral part of the aperture, the forward convex surface of the scoop bounding the uppermost side of the aperture.

Owing to the use of a thermally shielded location for the thermostatic element, the element cools rapidly, to provide a characteristically short recycle time of the thermostatic switching function.

The switching capability afforded by the disclosed thermosensitive element may be utilized as in the preferred embodiment by way of a thermostat, in a mechanical switching sense to control or modulate the energization of the electrical heating means of the kettle, or by way of a thermosensitive resistance element to modulate an electronic control circuit arranged in controlling relation with the kettle heating element.

In one embodiment the thermostatic switching element is arranged to de-energize the kettle heating circuit upon the occurrence of boiling.

In an alternative embodiment the thermostatic switching element is arranged to switch an auxiliary heating element of greater resistance into series connected relation with the main heating element, so as to reduce the power output of the heater to a level sufficient to sustain or nearly sustain the kettle in a low boiling condition, as distinct from a rapid, rolling boil condition.

A further embodiment includes the provision of a kettle mode selection switch in combination with the disclosed thermostatic switch, to afford the capability of open circuiting the auxiliary heating element, whereby the steam actuated thermostatic switch then functions in a simple on-off capacity with regard to the main heating element.

A further feature disclosed herein is the provision of a thermostat reset switch incorporated in the handle of the kettle wherein the switch actuation button is integrated with the lens of a tell-tale lamp location in the kettle handle. The tell-tale lamp is connected across the thermostatic switch and is lighted when the switch becomes open circuited on the occurrence of boiling. The lens of the tell-tale lamp is carried on and forms part of a flexible cantilevered support bar incorporated as a portion of the handle; the arrangement carrying a depending actuator arm. This actuator arm extends within the handle interior, to make contact with a reset button portion of the thermostatic switch. The occurrence of boiling releases the thermostat reset button to displace itself upwardly. Depression of the reset switch by the application of digital pressure downwardly on the lens of the tell-tale lamp repositions the reset button downwardly, to effect resetting of the thermostatic switch when it is in a sufficiently cooled condition to reset.

BRIEF DESCRIPTION OF THE DRAWINGS

Certain embodiments are described, reference being made to the accompanying drawings, wherein.

DESCRIPTION OF THE PREFERRED EMBODIMENT

Figure 1:
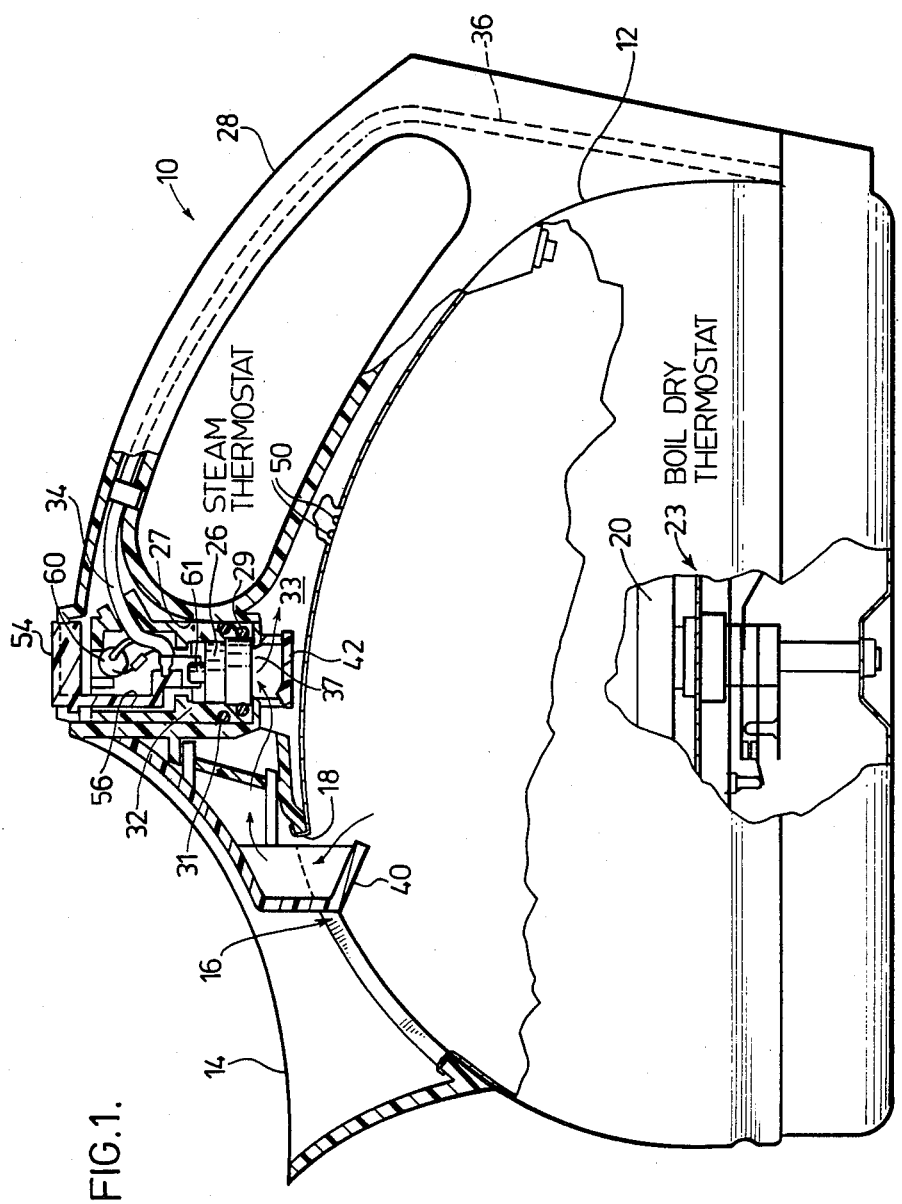
FIG. 1 is a side elevational view in partial section showing a kettle embodying the present invention.

Referring to FIG. 1, a kettle 10 according to the present invention has a body portion 12 with a spout 14 extending about an open aperture 16. The spout 14 is secured by crimping with the edges 18 of aperture 16, which arrangement does not constitute part of the present invention and is further disclosed in Canadian application Ser. No. 434,515 filed Aug. 12, 1983.

The aperture 16 provides both filling and pouring access for the liquid content of the kettle when in use, and permits the escape of steam at substantially atmospheric pressure, on the occurrence of boiling.

Figure 3:
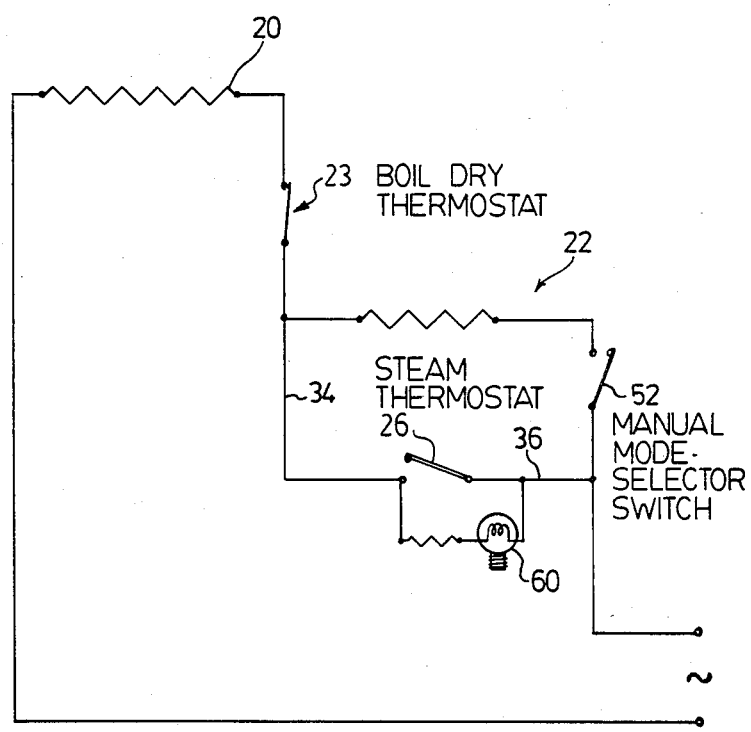
FIG. 3 is a schematic circuit diagram showing an embodiment having dual mode operation with a main and an auxiliary heating element.

The kettle 10 has a main electric heating element 20, and in a second embodiment an auxiliary element 22 (shown schematically in FIG. 3). The kettle 10 is protected by a "boil-dry" thermostatic cut out sub-assembly 23, well known in the art.

A thermally actuated control means, comprising a thermostat 26 in the illustrated embodiment, is located within an enclosure 27 in the kettle handle 28, being in sealed relation by way of O-ring seals 29, 31.

The thermostat 26 is connected by way of conductors 34, 36 in series controlling relation with the heating element 20, the conductors 34, 36 extending in concealed relation within the handle 28.

A lower portion 37 of thermostat 26 is exposed within lower chamber portion 33.

A fluid diverter comprising steam scoop 40 extends through the kettle aperture 16, to provide a reverse flow path for steam, so as to divert a portion of the steam flowing towards the spout aperture, to flow in the reverse direction towards the thermostat 26. The housing 32 which contains thermostat 26 has a downwardly depending portion 42 which serves to deflect steam entering the cavity 33 in impinging relation towards the lower portion 37 of the thermostat 26. The lower surface 43 of the depending portion 42 serves as a radiation shield for the thermostat 26, to complement the shield effect provided by the adjacent underlying portion of the kettle body.

Figure 2:
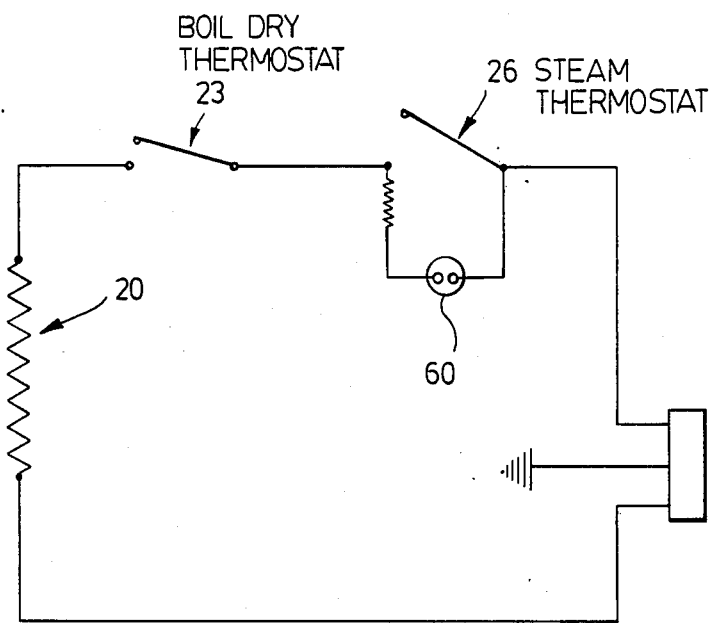
FIG. 2 is a schematic circuit diagram showing a single heating circuit.

One or more slight recesses 50 in the handle 28 facilitate the free flow of steam into the handle recess 33 upon the occurrence of active boiling of the kettle 10, such that the thermostat 26 is actuated in an open circuit mode. Thus in the case of the FIG. 2 circuit embodiment the kettle is switched off. In the FIG. 3 embodiment, with the switch 52 in a closed condition, actuation of thermostat 26 to the open circuit condition serves to effectively connect the low power auxiliary heater 22 in series with the main heater 20, thereby reducing the effective power to a level such that the kettle is maintained in a "low boil" or simmering condition.

When the selector switch 52 is set to an open condition, then the actuation of the thermostat 26 by the flow of steam to an open circuit condition serves to switch off the kettle heating elements.

A push button 54 in handle 28 is connected by way of an arm 56 to the thermostat reset button 61.

After cessation of boiling of the kettle 10 the thermostat 26 cools rapidly, and operation of the push button 54 resets the thermostat 26, and the heating of kettle 10 re-commences.

The push button 54 serves a dual function, as the lens for tell-tale light 60.

What I claim as new and desire to secure by Letters Patent of the United States of America is:

1. In an electric kettle having a kettle body, an electrical heating means associated with said kettle body for heating liquid within said body, an open aperture located in an upper portion of the body above the liquid level therein for the substantially unrestricted passage of steam therethrough; thermally activated control means connected to said heating means in controlling relation therewith, including a temperature sensitive portion thereof located exteriorly of said body in enclosed relation in an upper portion of the kettle; the improvement comprising shield means interposed between said control means and the interior of said body to limit the transfer of heat to said temperature sensitive portion during operation of the kettle, and fluid diverter means located within the kettle adjacent said aperture to intercept a portion of steam flowing towards said aperture and to divert said portion towards said temperature sensitive portion of said control means to provide rapid heating thereof on the commencement of active boiling of liquid within the kettle.

2. The kettle as claimed in claim 1, including deflector means located adjacent said temperature sensitive portion, to deflect said diverted steam against the portion.

3. The kettle as claimed in claim 2, wherein said deflector means includes a shield portion located beneath said temperature sensitive portion in radiation shielding relation therewith.

4. The kettle as claimed in claim 1, including handle means, said thermally activated control means being located therein.

5. The kettle as claimed in claim 4, having said fluid diverter means extending forwardly of said handle means and extending through said aperture into said kettle body, said control means comprising switch means electrically connected in controlling relation with said electrical heating means by conductors extending within said handle means.

6. The kettle as claimed in claim 5, said handle means forming in combination with an upper portion of said kettle body underlying said handle means a substantially enclosed chamber containing said thermally activated control means, said chamber being connected by said diverter means to the interior of the kettle, to receive steam therefrom when boiling occurs, said substantially enclosed chamber including at least one leakage path therefrom to permit the fluid received therein to escape exteriorly of the kettle.

7. The kettle as claimed in claim 1, said fluid diverter means including a scoop located adjacent said aperture, having a portion thereof extending within said kettle body to divert steam away from said aperture towards said temperature sensitive portion of said control means.

8. The kettle as claimed in claim 7, said scoop bounding the uppermost side of said aperture.

9. The kettle as claimed in claim 1, said fluid diverter means including a scoop extending through said aperture into said kettle body to provide a gaseous flow passage external to the body, to direct steam rearwardly away from the aperture towards said temperature sensitive portion of said control means, located rearwardly of the aperture.

* * * * *